Oct. 11, 1932. H. B. REDDING 1,881,953
VALVE
Filed Aug. 16, 1928
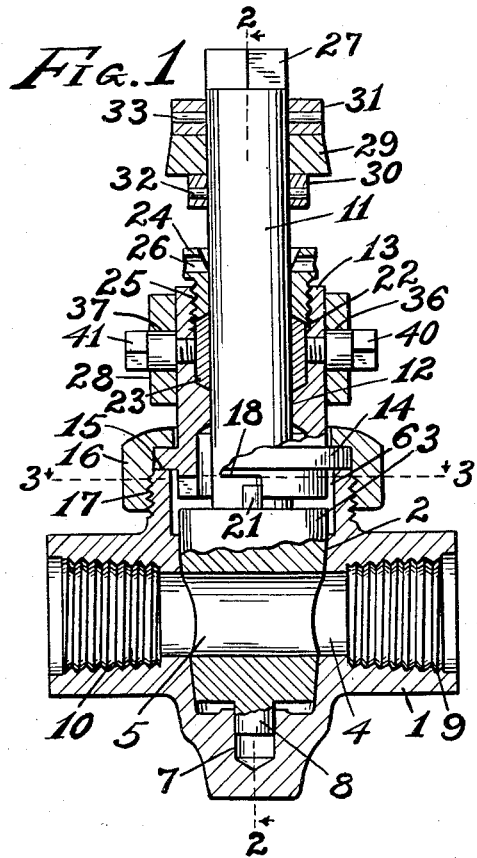
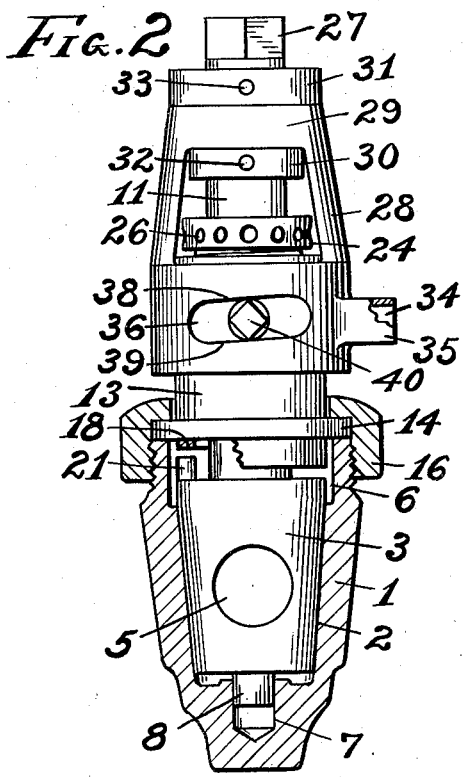
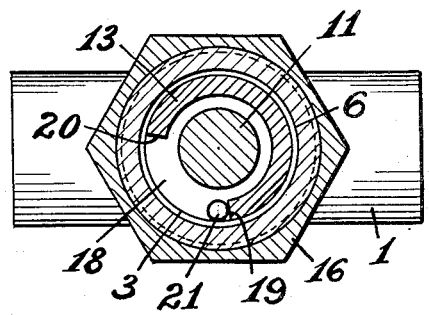
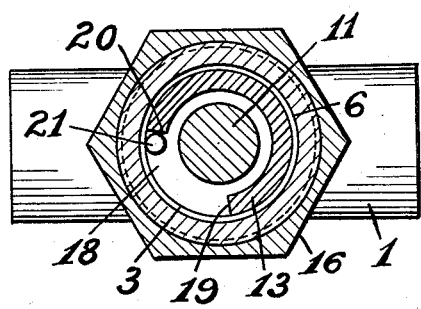
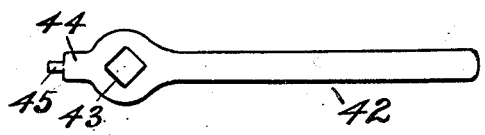
Inventor
H. B. Redding
By G. E. Dunstan,
his Attorney Patented Oct. 11, 1932

1,881,953

UNITED STATES PATENT OFFICE

HARRY B. REDDING, OF CLEVELAND, OHIO, ASSIGNOR, BY DIRECT AND MESNE ASSIGNMENTS, TO THE COLUMBUS VALVE MANUFACTURING CORPORATION, OF COLUMBUS, OHIO, A CORPORATION OF OHIO

VALVE

Application filed August 16, 1928. Serial No. 300,014.

This invention relates to valves, and has for its main object to provide a valve which may be locked against operation in its open or closed position.

Another object of the invention is to provide a valve of said character for high pressure service, which is so constructed that the plug thereof is tightly seated whether in its open or closed position and therefore sediment cannot accumulate at the seat around the plug or cause leakage and other troubles.

A further object of the invention is to provide a valve of said character which is of practical construction, easy and convenient in operation, and readily repaired.

With the above and other objects in view, the invention will be hereinafter fully described as illustrated in the accompanying drawing, and the novel features thereof will be particularly pointed out in the appended claims.

In the drawing, similar characters of reference are used to indicate corresponding parts.

Figure 1 is a longitudinal sectional view of a valve constructed in accordance with my invention, the plug being in its open position, Fig. 2 is a cross sectional elevation taken on line 2—2 of Fig. 1, Fig. 3 is a cross sectional view taken on line 3—3 of Fig. 1, Fig. 4 is a similar view, the plug being in its closed position, and Fig. 5 illustrates the lever handle or tool for adjusting and operating the valve.

Referring to the drawing, 1 represents a body which is preferably forged from a billet of steel, is provided with a vertical tapering bore 2 to form a seat for a plug 3, and a cross bore 4. The plug 3 is provided with a cross bore 5 which is in alignment with the cross bore 4. The vertical bore 2 is enlarged at its upper end as indicated at 6, and at the lower end is a smaller bore 7 for a guide 8 of the plug 3. Each end of the cross bore 4 is internally threaded, as indicated at 9 and 10, for the usual pipe connections. The stem 11 of the plug 3 extends through an opening 12 of a bonnet member 13 having a collar 14, which is clamped securely between the upper peripheral edge 15 of the body 1 and a bonnet nut 16 threaded upon the body at 17. The lower end of the bonnet member 13, below the collar 14, is cut out at 18 to provide stop faces 19 and 20, which are adapted to be engaged by a stop pin 21 fixed in the upper end of the plug 3 for limiting the rotation of said plug. The upper end of the bonnet member 13 is bored at 22 for a suitable packing 23, and a packing nut 24 is threaded therein at 25. Openings 26 are provided in the packing nut 24 for receiving a suitable tool for adjusting said nut. The plug 3 is rotated by means of a lever handle applied to the square portion 27 at the upper end of the stem 11.

In order to lock the plug 3 against rotation and raise and lower it freely without sidewise friction, a yoke member 28 is rotatably mounted upon the bonnet member 13 and its upper end terminates in a collar 29 which is rotatably mounted upon the stem 11 of said plug between a pair of thrust collars 30 and 31 fixed thereto by dowel pins 32 and 33. The yoke member 28 is rotated by means of a lever handle which is inserted in a socket 34 of a boss 35 extending laterally from said member. For the purpose of causing the yoke member 28 to force the plug 3 downwardly into wedging engagement with its seat 2 so that the plug will be locked against rotation, and to raise said plug slightly when it is desired to rotate the same, the following mechanism is provided. The yoke member 28 is provided with a pair of oppositely inclined slots 36 and 37, the upper and lower edges 38 and 39 of which are adapted to engage stud bolts 40 and 41 fixed in the bonnet member 13. For convenience in operating the plug 3, for rotating the yoke member 28, and for adjusting the packing nut 24, a combination tool indicated by 42 is employed. This tool consists of a handle having a square recess 43 for fitting the nut 27 of the stem of the plug, a forward shank 44 for fitting into the socket 34 of the yoke member and a tit 45 for entering the openings 26 of the packing nut.

In practice, assuming that the plug 3 is in its open position, the pin 21 of the plug being in engagement with the face 19 of the bonnet member 13, and the plug locked against rotatable movement by having been forced downwardly into wedging engagement with its seat 2 by the turning of the yoke member 28 clockwise, thereby causing the lower oppositely inclined edges 39 of the slots 36 and 37 to press upwardly upon the stud bolts 40 and 41 thus forcing the yoke member 13 downwardly, all parts are as shown. In order to be able to turn the plug 3, the yoke member 28 is turned counter clockwise by means of the tool 42, and this causes the upper oppositely inclined edges 38 of the slots 36 and 37 to press downwardly upon the stud bolts 40 and 41 thereby raising the yoke member 28 and the plug 3. The plug 3 having thus been released may be turned counter clockwise until the stop pin 21 strikes the face 20 when the plug will be in its fully opened position or to any desired position, by the application of the tool 42 to the upper end 27 of its stem, and then locked by turning the yoke member 28 clockwise.

From the drawing and description, it is readily seen that this valve may be easily and conveniently operated and locked in a fully or partially open position or a closed position, that the plug is in complete engagement with its seat at all times except when it is to be opened or closed, and that the valve is of practical construction for high pressure service.

Having fully described my invention, what I claim is:

1. In a valve, the combination of a body, the body having a seat, a rotatable plug adapted to engage the seat, a bonnet, the bonnet being fixed to the body, the body having a cutout, a pin fixed in the plug adapted to engage the end of the cutout of the bonnet, said plug having a stem projecting beyond said bonnet, a member, the member being rotatably mounted upon the stem beyond said bonnet and the outer side thereof, means for preventing longitudinal movement of said member relative to the stem, stud bolts carried by the bonnet, the stud bolts being round in cross section, said member having oppositely inclined slots, the slots having upper and lower straight edges, and the edges of said slots being adapted to engage said stud bolts upon rotation of said member for forcing the plug in either direction.

2. In a valve, the combination of a body, the body having a tapering seat, a rotatable plug adapted to engage the seat, a bonnet, the bonnet being fixed to the body, the bonnet having a cutout, a pin fixed in the plug adapted to engage the end of the cutout of the bonnet, the plug having a stem projecting beyond said bonnet, a yoke member, the yoke member having a collar, the collar being rotatably mounted upon said stem beyond said bonnet, thrust collars fixed to said stem at each side of and engaging the collar of said yoke member, the yoke member having a socket for receiving a tool for rotating said member to force said plug longitudinally, and the upper end of said stem projecting beyond said upper collar fixed to the stem for application of a lever handle.

In testimony whereof I affix my signature.

HARRY B. REDDING.